(12) United States Patent
Chatterjee et al.

(10) Patent No.: US 6,922,675 B1
(45) Date of Patent: Jul. 26, 2005

(54) SYSTEM AND METHOD FOR SERVICE TRANSACTION BROKERING AMONG DISTRIBUTED MARKETPLACES

(75) Inventors: Pallab K. Chatterjee, Dallas, TX (US); Gregory A. Brady, Colleyville, TX (US); John H. McGehee, Richardson, TX (US); Israel Hilerio, Irving, TX (US); Ajit Sagar, Coppell, TX (US)

(73) Assignee: i2 Technologies US, Inc., Dallas, TX (US)

( * ) Notice: Subject to any disclaimer, the term of this patent is extended or adjusted under 35 U.S.C. 154(b) by 977 days.

(21) Appl. No.: 09/679,464

(22) Filed: Oct. 4, 2000

Related U.S. Application Data
(60) Provisional application No. 60/226,051, filed on Aug. 16, 2000.

(51) Int. Cl.[7] ............................................. G06F 17/60
(52) U.S. Cl. ............................................. 705/26; 705/1
(58) Field of Search ................................. 705/26, 27, 1

(56) References Cited

U.S. PATENT DOCUMENTS

| | | | | |
|---|---|---|---|---|
| 5,694,551 | A | 12/1997 | Doyle et al. .................. | 705/26 |
| 5,926,798 | A | 7/1999 | Carter ......................... | 705/26 |
| 5,946,665 | A | 8/1999 | Suzuki et al. ................. | 705/26 |
| 5,995,945 | A | 11/1999 | Notani et al. .................. | 705/28 |
| 6,009,413 | A | 12/1999 | Webber et al. ................ | 705/26 |
| 6,029,141 | A | 2/2000 | Bezos et al. ................... | 705/27 |
| 6,055,516 | A | 4/2000 | Johnson et al. ............... | 705/27 |
| 6,085,176 | A | 7/2000 | Woolston ...................... | 705/37 |
| 6,145,002 | A * | 11/2000 | Srinivasan .................... | 709/225 |
| 6,490,567 | B1 * | 12/2002 | Gregory ....................... | 705/39 |
| 6,594,641 | B1 * | 7/2003 | Southam ....................... | 705/26 |
| 6,631,357 | B1 * | 10/2003 | Perkowski .................... | 705/26 |
| 2001/0049668 | A1 * | 12/2001 | Wright ......................... | 705/400 |
| 2001/0054087 | A1 * | 12/2001 | Flom et al. ................... | 709/218 |
| 2002/0046045 | A1 * | 4/2002 | Narin et al. ................... | 705/1 |
| 2002/0072974 | A1 * | 6/2002 | Pugliese, II et al. .......... | 705/14 |
| 2003/0139969 | A1 * | 7/2003 | Scroggie et al. .............. | 705/26 |
| 2004/0044590 | A1 * | 3/2004 | Voorhees ...................... | 705/27 |
| 2004/0054605 | A1 * | 3/2004 | Whittet ........................ | 705/27 |

FOREIGN PATENT DOCUMENTS

JP 11-15849 A * 1/1999

OTHER PUBLICATIONS

Gilchrist, J., "The Five P's of Cross–border Business: Pre–trading, Post–trading, Politics, Paranoia, Polarization," LatinFinance, p 343, Sep. 1995.*

Mulford, J., "The Electronic Market: Where Business Meets the Information Age," CommunicationsWeek, No. 603, p. 76, Apr. 1996.*

Henry George, "Progress and Poverty," Robert Schalkenbach Foundation, see Book IV, Chapter 2, pp. 235–237 and especially p. 237, lines 13–15 in Schalkenbach Foundation paperback edition, 1985, (4 pages including cover), 1879.

PCT, Notification of Transmittal of the International Search Report or the Declaration, 5 pages, Feb. 1, 2002.

* cited by examiner

*Primary Examiner*—Nicholas D. Rosen
(74) *Attorney, Agent, or Firm*—James E. Walton; Brian E. Harris

(57) ABSTRACT

A system for service transaction brokering among distributed marketplaces includes a first marketplace (102) that provides at least a first service and a second marketplace (102) that provides at least a second service. The system also includes a service transaction broker (104) that is coupled to the first and second marketplaces (102) and that provides at least the second service of the second marketplace (102) to a user (200) that is coupled to the first marketplace (102) in response to the user (200) communicating a service request.

51 Claims, 11 Drawing Sheets

SYSTEM AND METHOD FOR SERVICE TRANSACTION BROKERING AMONG DISTRIBUTED MARKETPLACES

RELATED APPLICATIONS

This application claims the benefit under 35 U.S.C. § 119(e) of U.S. Provisional Application Ser. No. 60/226,051 filed Aug. 16, 2000 entitled SYSTEM AND METHOD FOR SERVICE TRANSACTION BROKERING AMONG DISTRIBUTED MARKETPLACES.

TECHNICAL FIELD OF THE INVENTION

This invention relates to the field of computerized business transactions, and more particularly to a system and method for service transaction brokering among distributed marketplaces.

BACKGROUND OF THE INVENTION

Due to the proliferation of the Internet and the wide availability of technology providing access to the Internet, many services that were once available only through traditional "bricks and mortar" service providers are now being provided over the Internet. For example, electronic marketplaces ("e-marketplaces") now serve as intermediaries between buyers and sellers that may be located across the world from one another and communicate using the Internet. Two popular types of e-marketplaces currently in use are business-to-business ("B2B") and business-to-consumer ("B2C") marketplaces. E-marketplaces generally eliminate inefficiencies typical of traditional marketplaces by aggregating offerings from many sellers and by matching buyers and sellers in an exchange or auction. For buyers, e-marketplaces reduce purchasing costs by providing access to numerous sellers of a good or service and thus increasing competition between sellers. For sellers, e-marketplaces reduce costs by providing greater access to buyers and by reducing traditional capital investments (for example, investments in retail outlets).

However, although e-marketplaces provide many advantages over traditional marketplaces, inefficiencies still exist due to the need, in order to satisfy all the service needs of users, for each e-marketplace to provide a wide range of services or for users to contact multiple e-marketplaces to obtain the needed services. If an e-marketplace attempts to offer a wide range of services, many of these services may fall outside the core offering or "core competency" of the particular e-marketplace, and therefore are not provided most efficiently through that e-marketplace. For example, a B2C e-marketplace that serves as an intermediary between buyers and sellers of automobiles may provide an efficient method for sellers of automobiles to advertise and provide details about their automobiles and to enter into contracts for sale of the automobiles with buyers. However, this same e-marketplace may also provide automobile insurance services to the buyers, even though it may not be capable of providing such services in an efficient manner (since it has been designed to focus on automobile sales, has been designed without appropriate expertise, or for any other reason). Furthermore, this insurance service may be duplicative of insurance services provided through other e-marketplaces. Alternatively, the e-marketplace may not provide any insurance services, creating the need for the buyer to contact another e-marketplace or a traditional marketplace to obtain the needed insurance. These and other deficiencies have made previous e-marketplaces inadequate for the needs of many users.

SUMMARY OF THE INVENTION

According to the present invention, disadvantages and problems associated with previous systems and methods for facilitating business transactions using e-marketplaces have been substantially reduced or eliminated.

According to one embodiment of the present invention, a system for service transaction brokering among distributed marketplaces includes a first marketplace that provides at least a first service and a second marketplace that provides at least a second service. The system also includes a service transaction broker that is coupled to the first and second marketplaces and that provides at least the second service of the second marketplace to a user that is coupled to the first marketplace in response to the user communicating a service request.

In a particular embodiment, the transaction broker receives a service registration request from the second marketplace that includes information related to the second service. The transaction broker stores the information in a master service database such that the second service may be available to the user of the first marketplace.

In another particular embodiment, the transaction broker receives a subscription request from the first marketplace. The subscription request indicates a service that is provided by the second marketplace to which the first marketplace wishes to subscribe. The transaction broker processes the subscription request and communicates information associated with the service to the first marketplace.

In yet another particular embodiment, the transaction broker receives a service request for the second service from the first marketplace and determines the location of the second service. The transaction broker also binds and invokes the second service for use by the user of the first marketplace.

The present invention provides a number of important technical advantages. For example providing a transaction broker that facilitates the integration of service offerings provided by multiple e-marketplaces is one such advantage. The transaction broker links and integrates otherwise isolated e-marketplaces having specialized sets of services and allows users of one e-marketplace to take advantage of services provided by other e-marketplaces.

As described above, to provide full service to users, some e-marketplaces provide non-core services to customers. This creates a situation in which e-marketplaces are inefficiently providing services outside their core competency and in which the same services are being redundantly provided by numerous e-marketplaces. Alternatively, e-marketplaces may choose not to provide these non-core services, thereby forcing users to go to other e-marketplaces to complete transactions. In either situation, inefficiencies are created.

The present invention reduces or eliminates these inefficiencies by linking and integrating multiple e-marketplaces. For example, an e-marketplace that provides services allowing sellers of automobiles to sell to buyers may be linked to and integrated with an e-marketplace that provides insurance services. These e-marketplaces may be seamlessly integrated such that the buyer can connect to the automotive e-marketplace to purchase an automobile and can also arrange for insurance for the automobile using the insurance e-marketplace through the automotive e-marketplace. The user therefore obtains purchasing and insurance services from different e-marketplaces in a single transaction and only has to directly connect to a single e-marketplace. The user may even be unaware that the services are being provided through different e-marketplaces. Therefore, the user obtains the desired services in a convenient manner and the inefficient provision or duplication of services is avoided. Other important technical advantages are readily apparent to those skilled in the art from the following figures, descriptions and claims.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1:
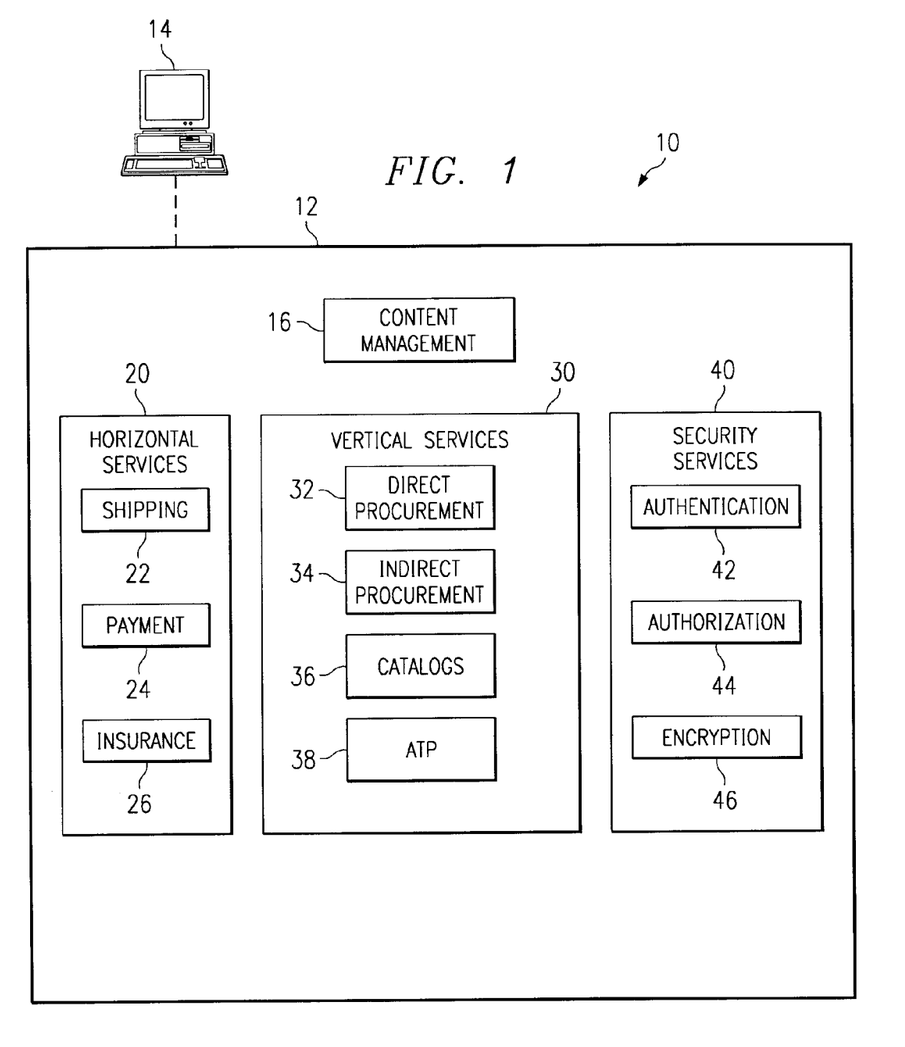
FIG. 1 illustrates an exemplary centralized marketplace architecture.

FIG. 1 illustrates an exemplary centralized marketplace architecture 10. Marketplace architecture 10 includes a single marketplace 12 that provides users with access to selected services. The services provided may include any service that may be provided to a user, including any service that provides the user with information or that processes information on the user's behalf. Marketplace 12 may be an e-marketplace that is coupled to the Internet and that provides users of the Internet with access to selected services. However, users may access marketplace 12 using any appropriate wireline or wireless communication link. Marketplace 12 may be implemented using any appropriate combination of hardware, software, or firmware operating on one or more computer systems 14 at one or more locations.

Since it has a centralized architecture, marketplace 12 is designed to provide all of the services needed by a user to complete a transaction. For example, marketplace 12 provides horizontal services 20 that may include shipping services 22, payment services 24, insurance services 26, or any other appropriate horizontal services. Marketplace 12 also provides vertical services 30 that may include direct procurement services 32, indirect procurement services 34, catalog services 36, available-to-promise (ATP) services 38, or any other appropriate vertical services. Marketplace 12 may also provide security services 40 used to provide secure and authentic business transactions with users over the Internet or other communications link. Security services 40 may include authentication services 42, authorization services 44, encryption services 46, or any other appropriate security services. Furthermore, any other appropriate services may also be provided by marketplace 12. The provision of services through marketplace 12 is managed using a content management module 16. Content management module 16 may store or be able to access user profiles and other personal information associated with the users of marketplace 12, and content management module 16 may tailor the services provided by marketplace 12 to the users according to this personal information.

As described above, the provision of a wide range of services, such as those provided by marketplace 12, is often inefficient since some of the services provided may be ancillary to the primary purpose of marketplace 12 and may be duplicated in several other marketplaces accessible over the Internet. However, marketplace 12 is not integrated with these other marketplaces and must provide all the services needed by its users to complete a transaction. For example, although the primary purpose of marketplace 12 may be to facilitate advertising and sales of automobiles using direct procurement services 32, marketplace 12 may also provide automobile insurance services 26 even though the provision of insurance services 26 may be inefficient or duplicative of services offered by other marketplaces.

Figure 2A:
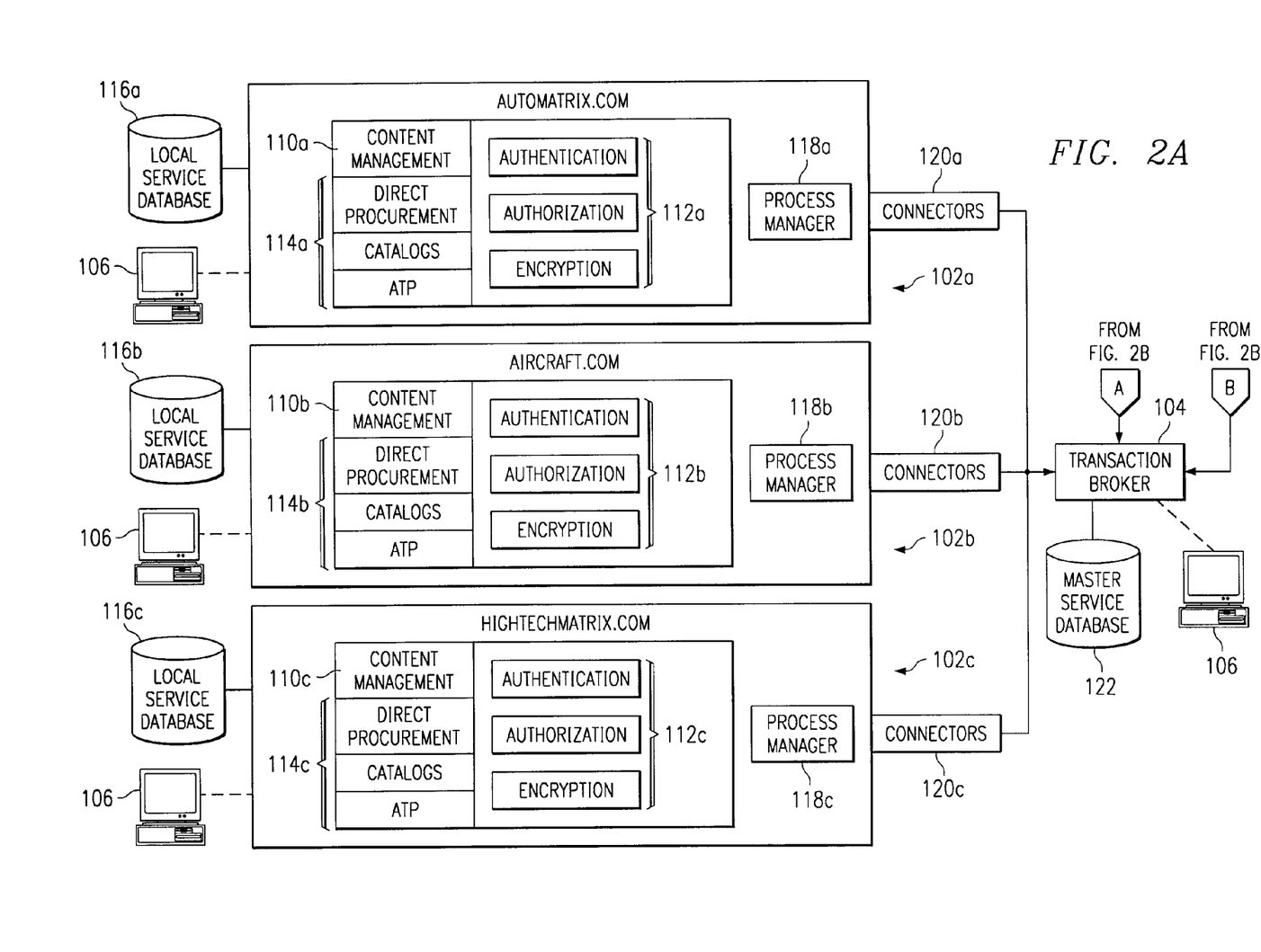
FIGS. 2A and 2B illustrate an exemplary distributed marketplace architecture.
Figure 2B:
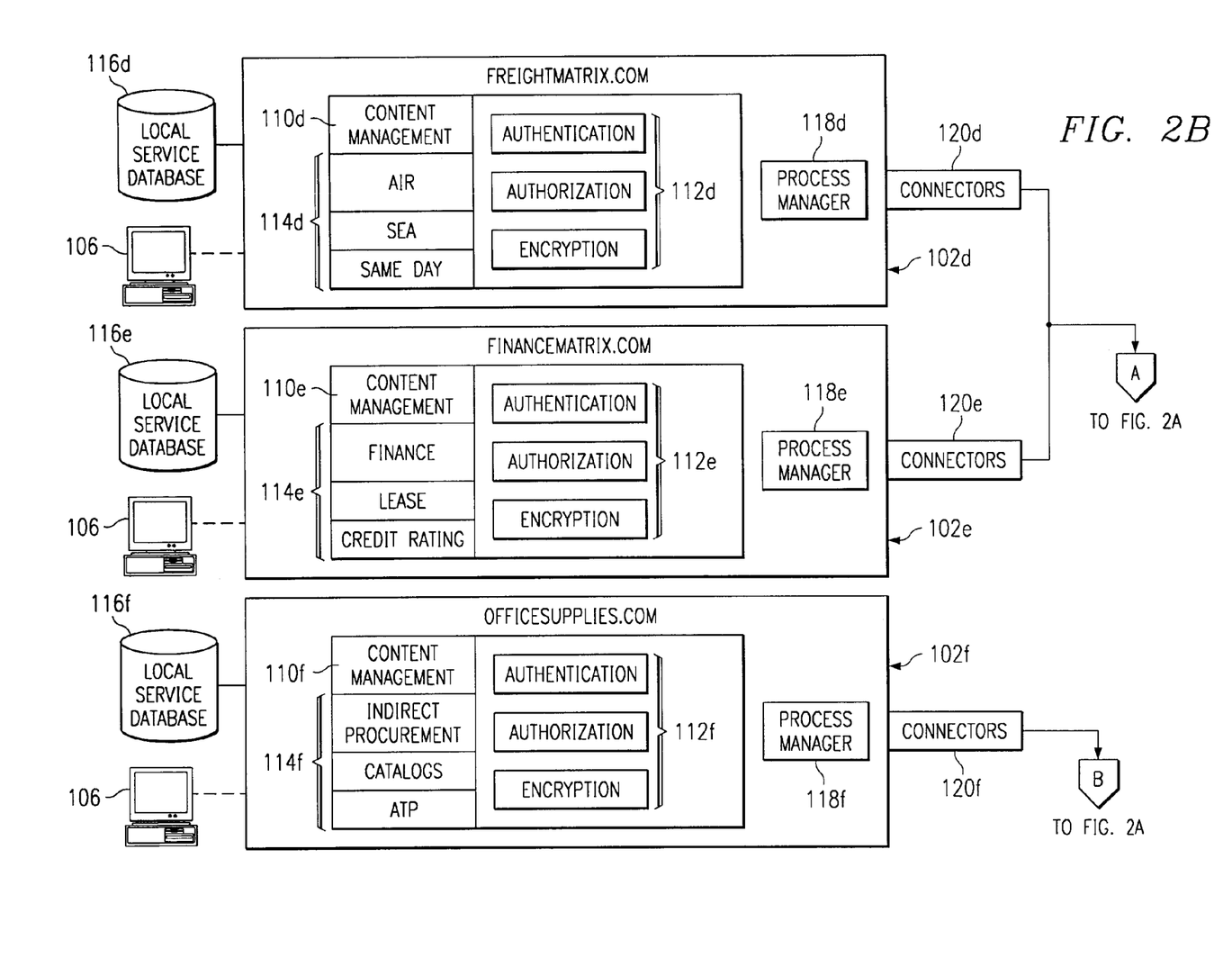

FIGS. 2A and 2B illustrates an exemplary distributed marketplace architecture 100. Marketplace architecture 100 includes a number of marketplaces 102a–e that are coupled using a transaction broker 104. Marketplaces 102 may be e-marketplaces that are coupled to the Internet and that provide users of the Internet with access to selected services. Similarly, marketplaces 102 may be coupled to transaction broker 104 using the Internet. However, users may access marketplaces 102 using any appropriate wireline or wireless communication link, and marketplaces 102 may be coupled to transaction broker 104 using any appropriate wireline or wireless communication link. Marketplaces 102 and transaction broker 104 may be implemented using any appropriate combination of hardware, software, or firmware operating on one or more computer systems 106 at one or more locations.

Examples of marketplaces 102 include business-to-business (B2B) and business-to-consumer (B2C) e-marketplaces that use the Internet to provide a point of exchange between businesses and customers. Exemplary marketplaces 102 might include automatrix.com (a marketplace for buying and selling automobiles, components, and related services), aircraft.com (a marketplace for buying and selling aircraft, components, and related services), hightechmatrix.com (a marketplace for buying and selling high tech goods, components, and services), officesupplies.com (a marketplace for buying and selling office supplies), freightmatrix.com (a marketplace for providing shipping services), and financematrix.com (a marketplace for providing financial services). Marketplaces 102a–e are merely examples of marketplaces that may be included in distributed marketplace architecture 100 and any other appropriate type or number of marketplaces 102 may be included in architecture 100 instead of or in addition to these exemplary marketplaces.

Marketplaces 102 may be separate entities that are each focused on a particular sector of the economy. As described above in relation to marketplace 12, although marketplaces 102 might all currently exist on the Internet, there has been no standard connectivity between such marketplaces 102 and a method has not been provided to allow the services of marketplaces 102 to be effectively integrated. According to the present invention, distributed marketplace architecture 100 includes transaction broker 104 that couples marketplaces 102 and allows services of one marketplace 102 to be provided to users of any other marketplace 102 coupled to transaction broker 104. This allows each marketplace 102 to focus on its core services and avoid the expense and inefficiency of providing unrelated and duplicative services, providing an important technical advantage.

For example, marketplace 102a (automatrix.com) may provide an environment where manufacturers or dealers of automobiles advertise to and communicate with buyers of these automobiles to facilitate the sale of the automobiles. Therefore, the primary function of marketplace 102a should be to facilitate communications between buyers and sellers of automobiles and to provide information to the buyers and sellers regarding the sale of the automobiles. In this respect, marketplace 102a provides vertical services, namely the sale of automobiles from manufacturers or dealers to consumers.

However, if marketplace 102*a* had a centralized marketplace architecture 10, as described with reference to FIG. 1, then marketplace 102*a* would also need to provide horizontal services such as shipping services, payment services, and insurance services. These horizontal services are ancillary to the core vertical service that is provided by marketplace 102*a* and thus marketplace 102*a* does not provide the most effective and efficient way to provide these horizontal services.

Distributed marketplace architecture 100 helps eliminate these inefficiencies by coupling marketplace 102*a* to other marketplaces 102*b–e* that may provide services to users of 102*a* in a more efficient manner than these services may be provided by marketplace 102*a*. For example, instead of providing shipping services through marketplace 102*a*, marketplace 102*a* may be coupled to marketplace 102*d* (freightmatrix.com) through transaction broker 104 to allow marketplace 102*d* to provide shipping services to users of marketplace 102*a*, with or without their knowledge. Likewise, marketplace 102*e* (financematrix.com) may be coupled to marketplace 102*a* through transaction broker 104 to provide financing and payment services to users of marketplace 102*a*, with or without their knowledge. Therefore, marketplace 102*a* may focus on its core service—the sale of automobiles—and provide ancillary horizontal services through transaction broker 104 using other marketplaces 102*d* and 102*e*. For example, a user of marketplace 102*a* may obtain information about an automobile and enter into a contract for the purchase of the automobile using the services provided directly by marketplace 102*a*. The user may then obtain shipping and payment services through transaction broker 104 using marketplaces 102*d* and 102*e*. However, because of the integration of marketplaces 102*a*, 102*d*, and 102*e*, the user may be unaware that the services are being facilitated by transaction broker 104 using different marketplaces 102. Therefore, distributed marketplace architecture 100 and transaction broker 104 provide a seamless integration of diverse marketplaces 102 and allow marketplaces 102 to provide a diverse range of services to their users while focusing on their core competencies.

Each marketplace 102 may include support services that are used to provide the primary services offered by each marketplace 102. For example, marketplaces 102 may include content management services 110, security services 112, or any other suitable support services. Marketplaces 102 also include primary or core services 114 that are provided by the marketplace 102. For example, the primary services 114*a* in marketplace 102*a* may include direct procurement services, catalog services, ATP services, or any other suitable primary services. In one embodiment, marketplaces 102 are each associated with a local service database 116 that provides a directory of the services provided by the associated marketplace 102 and with a process manager 118. Process manager 118 manages communications between the associated marketplace 102 and transaction broker 104, and manages access to the services provided by other marketplaces 102.

As described above, unlike marketplace 12 of FIG. 1, marketplaces 102 need not include ancillary services. Instead, marketplaces 102 are connected to other marketplaces 102 through transaction broker 104 to obtain these ancillary services using the other marketplaces 102. To facilitate this interconnection and integration of marketplaces 102, each marketplace 102 includes one or more connectors 120 that serve as an interface suitable for the communications link between the marketplace 102 and transaction broker 104.

Although marketplaces 102 may be e-marketplaces that are coupled to the Internet, transaction broker 104 provides a common execution environment that integrates the services provided by marketplaces 102 in a manner not provided by typical Internet connectivity. For example, through the use of a master service database 122, transaction broker 104 provides a central point for dynamic registration and discovery of services provided by marketplaces 102. Transaction broker 104 also provides a common service description language and request description language that allow appropriate services of one marketplace 102 to be identified to a user of another marketplace 102 and that allow a request for service from one marketplace 102 to be fulfilled from another marketplace 102. Furthermore, although a single transaction broker 104 is illustrated, multiple brokers 104 may also be used. The multiple brokers 104 may be coupled to form a network of brokers 104. In this networked configuration, brokers 104 may share information such that marketplaces 102 may use any broker 104 in the network to obtain services from any marketplace 102 coupled to the network. Such a network of brokers 104 allows multiple brokers 104 to share the load of providing services to users from marketplaces 102 and allows selected brokers 104 to be specialized for certain types of marketplaces 102.

Figure 3:
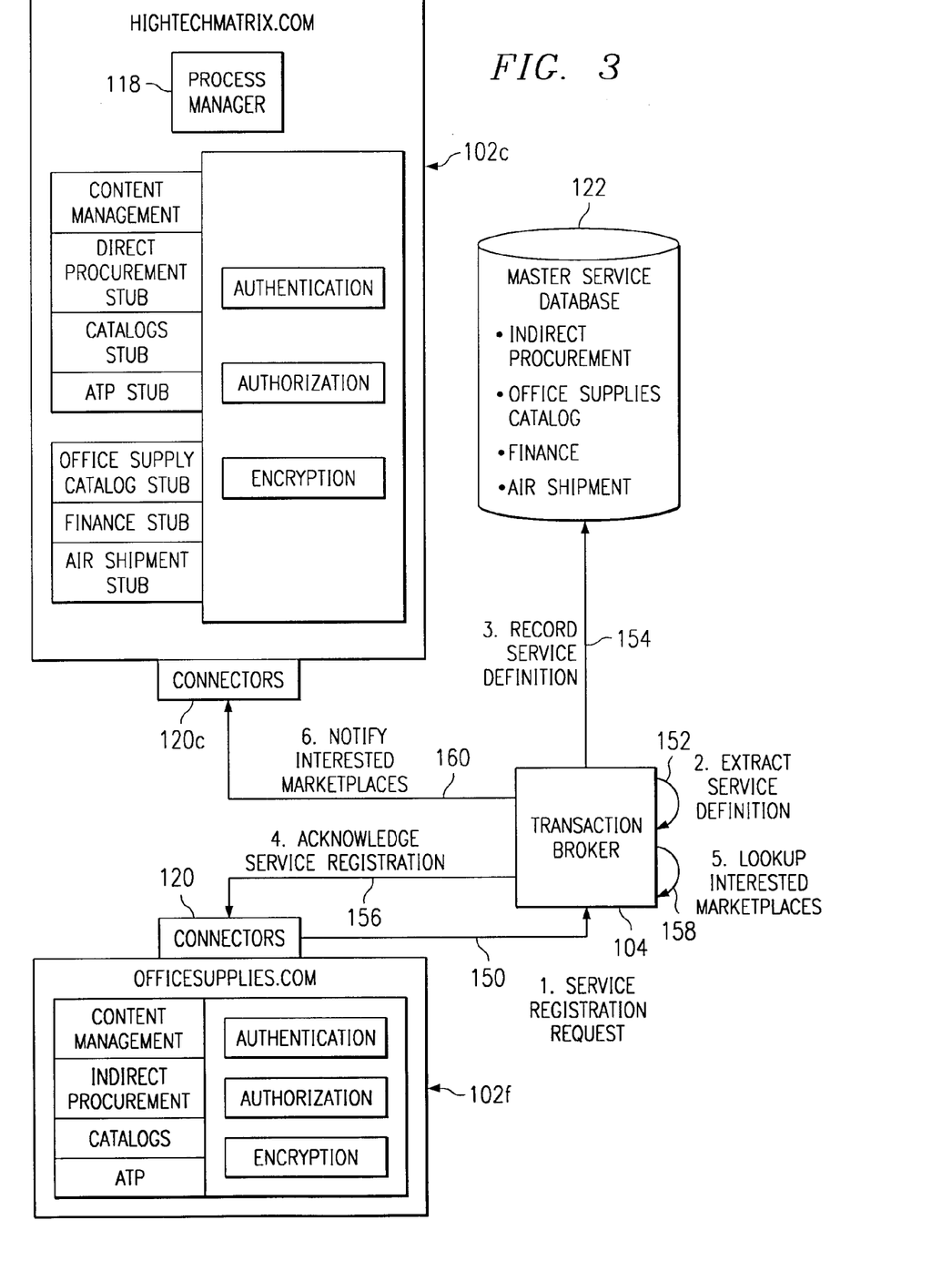
FIG. 3 illustrates an exemplary method of registering a service with a transaction broker.

FIG. 3 illustrates an exemplary method of registering a service with transaction broker 104. Such a method may be used by a marketplace 102 to inform other marketplaces 102 of the services provided by the marketplace 102. The method begins when a marketplace 102, such as marketplace 102*f*, communicates a service registration request to transaction broker 104, as indicated by arrow 150. In one embodiment, the service registration request includes the attributes of the service being registered and the interfaces needed to access the service. Transaction broker 104 receives the service registration request from marketplace 102*f*, as indicated by arrow 152, and extracts a service definition from the registration information included in the request.

Transaction broker 104 records the service definition (including the attributes of and interfaces to the service) in master service database 122, as indicated by arrow 154. As described below, in one embodiment master service database 122 includes a directory hierarchy used to store service definitions for the various services offered by the marketplaces 102 included in distributed marketplace architecture 100. For example, if marketplace 102*f* registers an indirect procurement service, transaction broker 104 records a service definition for the indirect procurement service in master service database 122. Master service database 122 also includes service definitions for the other services of marketplace 102*f* and other marketplaces 102 that have been registered with transaction broker 104. The information in database 122 may be accessible directly by transaction broker 104 (for example, transaction broker 104 may be able to search database 122). Alternatively, database 122 may include an associated processor that receives lookup requests from transaction broker 104 for specific information, retrieves the relevant information from database 122, and returns the results to transaction broker 104. Any other appropriate method of obtaining information from database 122 may be used.

Before, during, or after transaction broker 104 records the service definition for the service being registered by marketplace 102*f* in database 122, transaction broker 104 communicates a service registration acknowledgement to marketplace 102*f*, as indicated by arrow 156. Once the service provided by marketplace 102*f* is registered in this manner with transaction broker 104, transaction broker 104 may notify other marketplaces 102 about the service that is now available to them. In one embodiment, transaction broker 104 identifies potentially interested marketplaces 102 by performing a lookup, as indicated by arrow 158. Transaction broker 104 determines which marketplaces 102 might be interested in the newly registered service. This determination may be based on information provided by marketplaces 102 or any other appropriate source and may be made in any appropriate manner. When transaction broker 104 has determined the interested marketplaces 102, transaction broker 104 notifies the interested marketplaces 102 of the service registration, as indicated by arrow 160.

Figure 4:
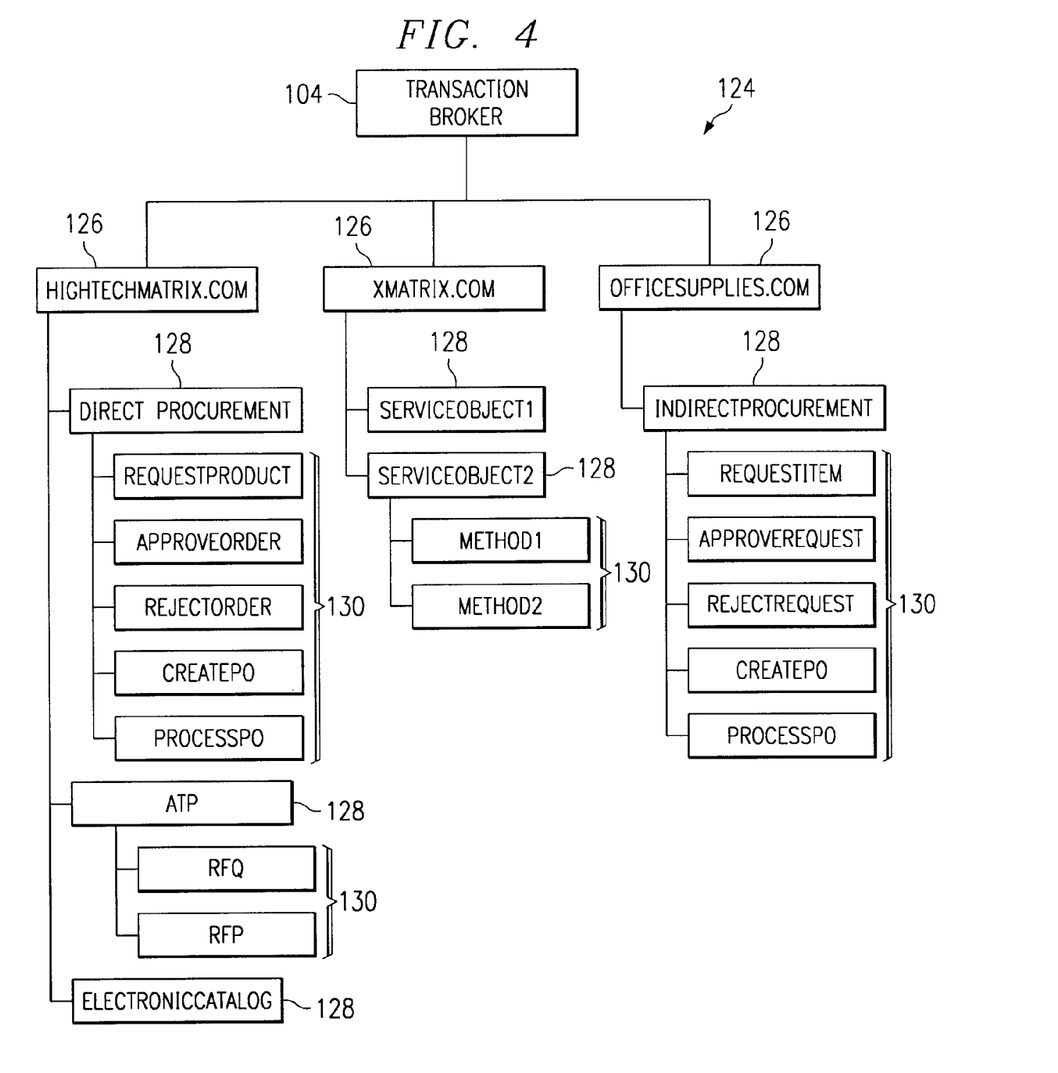
FIG. 4 illustrates an exemplary hierarchy of service definitions in a master service database.

FIG. 4 illustrates an exemplary hierarchy 124 of service definitions in master service database 122. Hierarchy 124 may include one or more directories 126 each associated with a marketplace 102 and accessible by transaction broker 104. Each directory 126 includes one or more service objects 128 that are associated with a service provided by the associated marketplace 102. In one embodiment, when a new service is registered with transaction broker 104, transaction broker 104 creates a service object 128 that represents the service. The service object 128 may be expressed as an interface or schema and may contain one or more methods 130 that define how the service facilities associated with service object 128 are to be accessed. Service object facilities can be invoked using any appropriate distributed system facilities such as CORBA, RMI, DCOM, HTTP, or e-mail. Master service database 122 may store these objects 128 and methods 130 in appropriate directories 126 within hierarchy 124. For example only and not by way of limitation, a direct procurement service object 128 within a hightechmatrix.com directory 126 might include a RequestProduct method 130, ApproveOrder method 130, a RejectOrder method 130, CreatePurchaseOrder method 130, a ProcessPurchaseOrder method 130 or any other appropriate methods 130 in any combination. Service objects 128 also include parameters that define the service object 128. These parameters may be objects themselves. For example, a particular service object 128 might include a purchase order parameter, a process requisition parameter, and a request for quote parameter. A parameter may be used differently based on the service that utilizes it.

Figure 5:
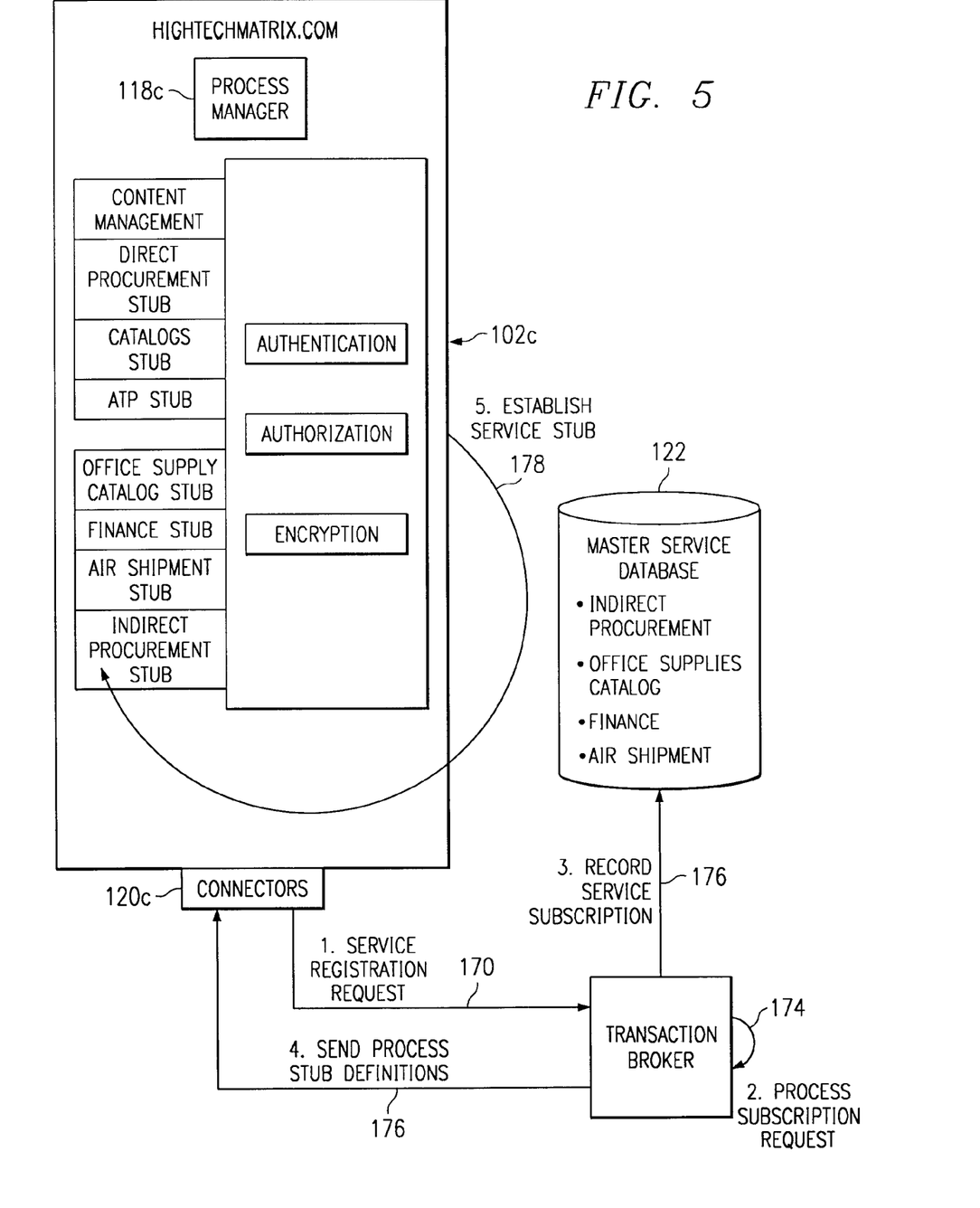
FIG. 5 illustrates an exemplary method of subscribing to a service.

FIG. 5 illustrates an exemplary method of subscribing to a service. Such a method may be used by a marketplace 102 that desires to provide the service of another marketplace 102 to its users. The method begins when a marketplace 102, such as marketplace 102c, communicates a service subscription request to transaction broker 104, as indicated by arrow 170. For example, marketplace 102c may communicate a subscription request for a service already available or in response to receiving a notification of a newly registered service from transaction broker 104. Although a single service subscription request is illustrated, marketplace 102c may subscribe to multiple services at the same time. Transaction broker 104 processes the subscription request, as indicated by arrow 172, and records the service subscription in master service database 122, as indicated by arrow 174. The recording of the subscription request in database 122 may include adding marketplace 102c to a list of subscribers to the service and providing marketplace 102c with access privileges to information about the service.

In one embodiment, transaction broker 104 communicates to marketplace 102c definitions of a process stub or other appropriate software component associated with the service to which marketplace 102c has subscribed, as indicated by arrow 176. When marketplace 102c has received the process stub definitions, marketplace 102c establishes an appropriate process stub, as indicated by arrow 178. For example, if marketplace 102c requested to subscribe to an indirect procurement service, then the process stub definitions communicated to marketplace 102c would be used to establish an indirect procurement process stub. The process stub may be created by process manager 118 or in any other suitable manner. Marketplace 102c may include other stubs that have been created based on other services to which marketplace 102c has subscribed or that are associated with the primary services provided by marketplace 102c.

Figure 6:
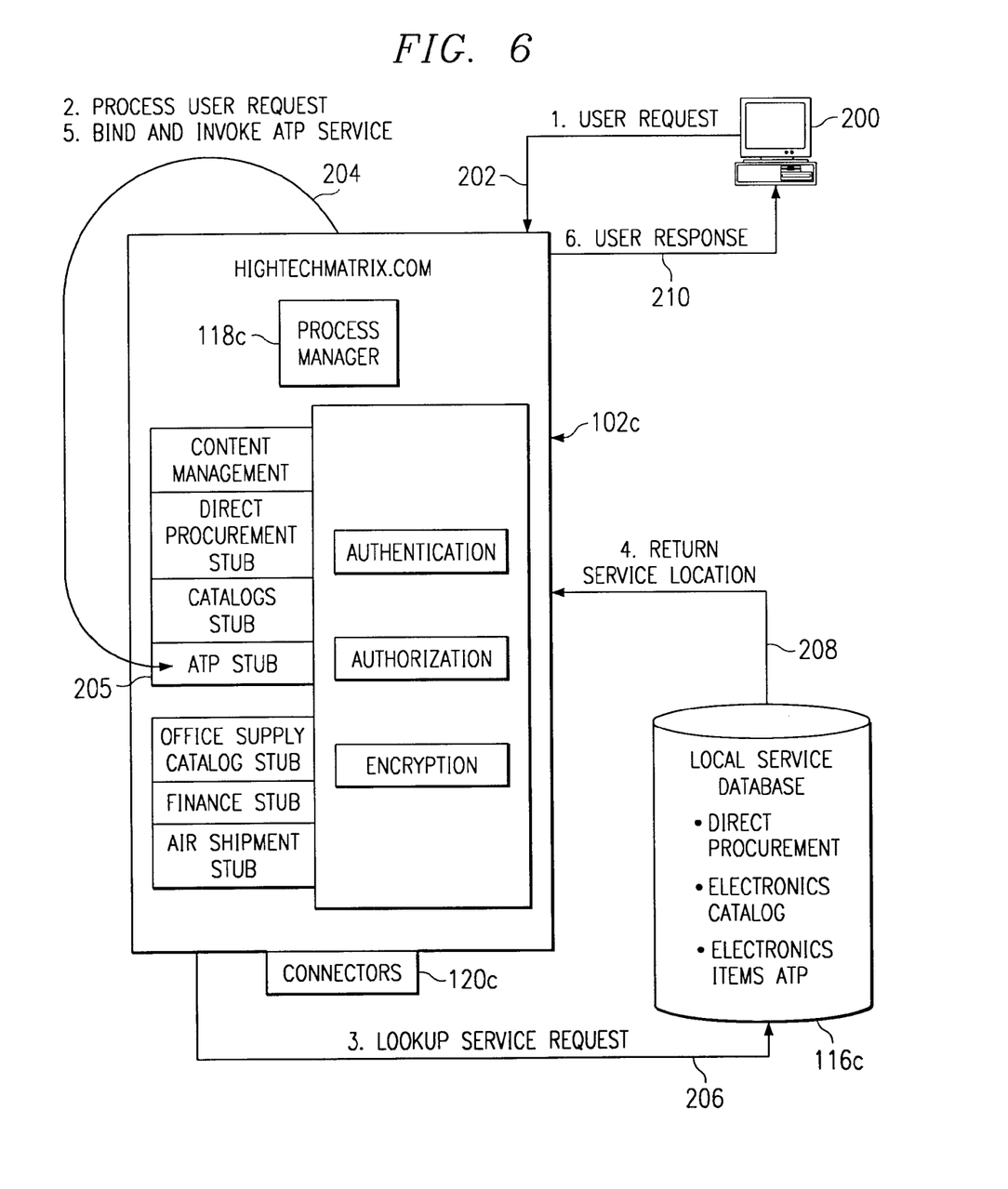
FIG. 6 illustrates an exemplary method of invoking a local service.

FIG. 6 illustrates an exemplary method of invoking a local service of a marketplace 102. A local service is a service provided by the marketplace 102 at which a user requests the service. The method begins when a user 200 submits a user request to marketplace 102c, as indicated by arrow 202. As an example only and not by way of limitation, assume that user 200 requests ATP information for a certain type of computer hard drive. Process manager 118c receives and processes the hard drive ATP request, as indicated by arrow 204. This processing includes determining that the ATP request should be handled using an ATP service associated with an ATP process stub 205. Process manager 118c then communicates a lookup service request to local service database 116c, as indicated by arrow 206, to determine a location of the ATP service. Assuming that an ATP service that can process a hard drive ATP request is located at marketplace 102c, process manager 118c will receive an ATP service location from database 116c, as indicated by arrow 208. Since the ATP service is located locally, process manager 118c delivers the ATP request to the ATP service, and the ATP service communicates a user response containing the requested hard drive ATP information to user 200, as indicated by arrow 210.

Figure 7A:
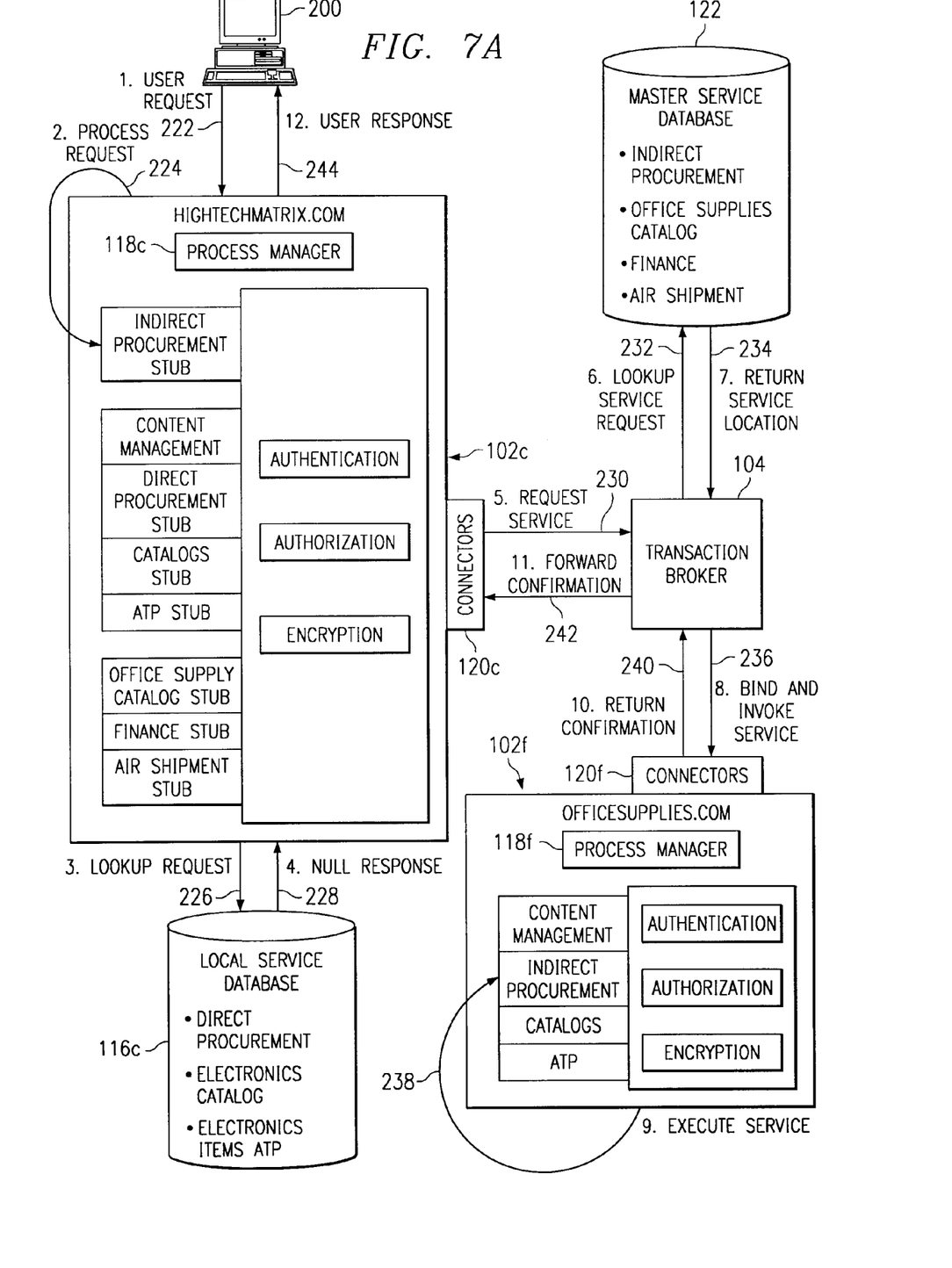
FIG. 7A illustrates an exemplary method of invoking a distributed service.

FIG. 7A illustrates an exemplary method of invoking a distributed service. A distributed service is a service that is not provided locally at a marketplace 102 at which a user requests the service. Therefore, the service is provided using another marketplace 102 through transaction broker 104. The method begins when a user 200 communicates a user request to marketplace 102c, as indicated by arrow 222. As an example only and not by way of limitation, assume that the user request includes a purchase order for ten boxes of paper. Process manager 118c receives and processes the purchase order as indicated by arrow 224. This processing includes determining that the purchase order should be handled using an indirect procurement service associated with an indirect procurement process stub. Process manager 118c communicates a lookup service request to local service database 116c, as indicated by arrow 226, to determine a location of the indirect procurement service. Assuming that marketplace 102c does not include an indirect procurement service that can fill a purchase order for boxes of paper, process manager 118c receives a null response to the lookup service request from local service database 116c, as indicated by arrow 228, indicating that the needed service is not located at marketplace 102c. Based on the null response, process manager 118c determines that the indirect procurement service is a distributed service located at another marketplace 102 and communicates a request for the indirect procurement service to transaction broker 104 using connectors 120c, as indicated by arrow 230.

Transaction broker 104 receives the request for the indirect procurement service and communicates a lookup service request to master service database 122, as indicated by arrow 232, to determine the location of the indirect procurement service. In response to the lookup request, transaction broker 104 receives a location of the indirect procurement service from master service database 122, as indicated by arrow 234. As an example, assume that the indirect procurement service through which boxes of paper may be obtained is located at marketplace 102f Based on the location information received from master service database 122, transaction broker 104 may communicate a message to process manager 118f of marketplace 102f to bind and invoke the indirect procurement service, as indicated by arrow 236. This message may include parameter information associated with the purchase order that is used to fulfill the purchase order. In an exemplary embodiment, an incoming service listener may be provided with or included in process manager 118f to recognize and/or receive incoming service requests.

In response to receiving the message from transaction broker 104, process manager 118f of marketplace 102f fulfills the purchase order using the indirect procurement service, as indicated by arrow 238, and communicates a purchase confirmation to transaction broker 104, as indicated by arrow 240. Transaction broker 104 forwards this purchase confirmation to process manager 118c, as indicated by arrow 242, and process manager 118c communicates a user response to user 200 confirming the purchase, as indicated by arrow 244. Once the boxes of paper have been purchased, the boxes will typically need to be shipped to the user. If marketplace 102f provides shipping services, then process manager 118f may use the shipping services to ship the boxes of paper to user 200. However, as shipping services are not provided in exemplary marketplace 102f (since this may not be a core competency of marketplace 102f), the boxes of paper need to be shipped using a distributed service at another marketplace 102. Other ancillary services may also be provided by other marketplaces 102.

Figure 7B:
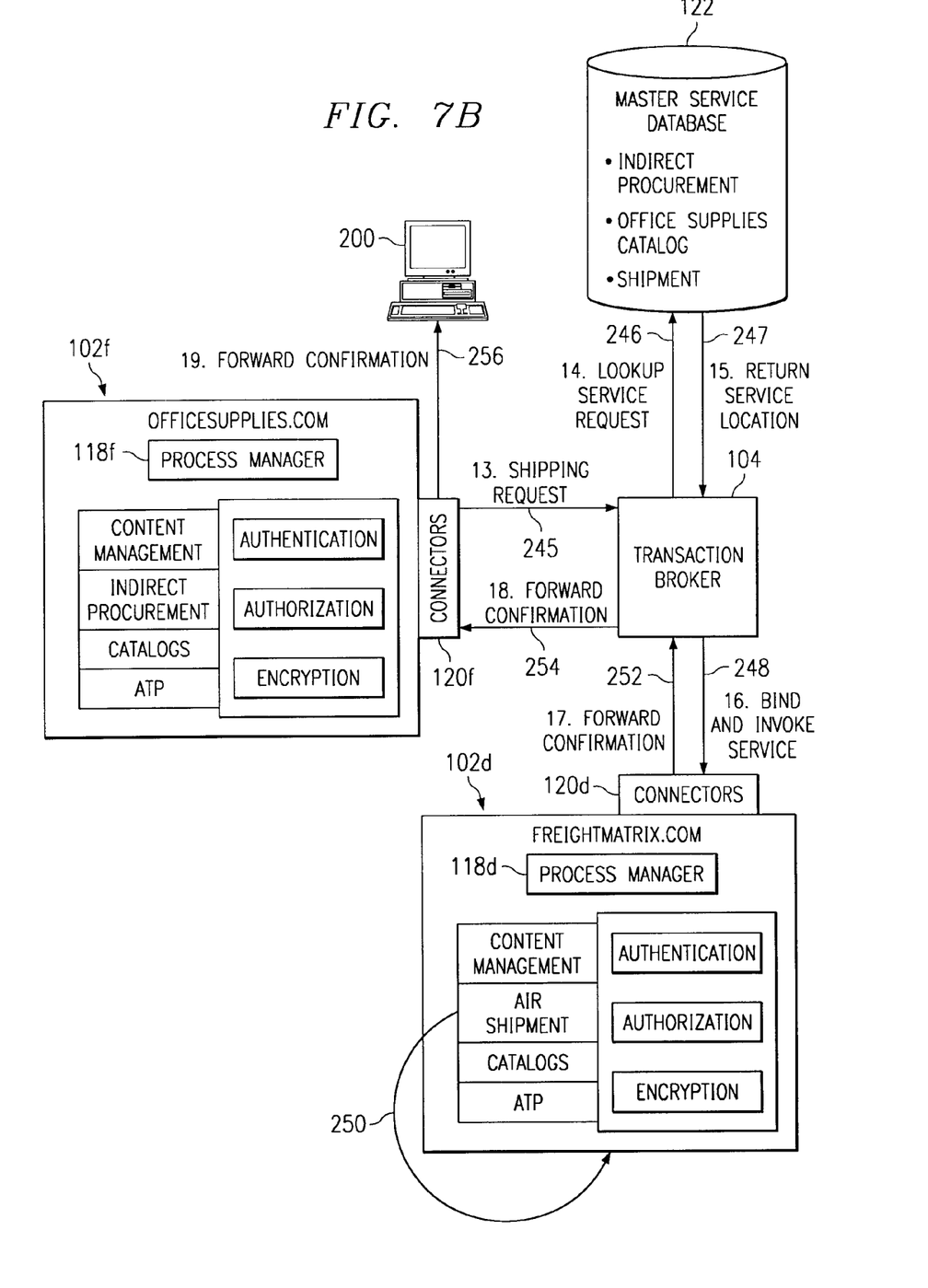
FIG. 7B illustrates an exemplary method of invoking another distributed service to complete a transaction.

FIG. 7B illustrates an exemplary method of invoking another distributed service to complete the transaction begun by user 200. For example, if marketplace 102f cannot supply the needed shipping service, process manager 18f of marketplace 102f communicates a shipping request to transaction broker 104 that includes information about the goods that have been purchased and when and where they are to be delivered, as indicated by arrow 245. Transaction broker 104 communicates a lookup service request to master service database 122, as indicated by arrow 246, to determine a location of the shipping service. In response to the lookup service request, master service database 122 returns the location of the shipping service to transaction broker 104, as indicated by arrow 247. Assuming that marketplace 102d (freightmatrix.com) provides the air shipment service, transaction broker 104 communicates a message to marketplace 102d to bind and invoke the shipping service, as indicated by arrow 248. Process manager 118d of marketplace 102d receives the message and processes the purchase order information using the shipment service, as indicated by arrow 250. Process manager 118d then forwards a shipping confirmation to transaction broker 104, as indicated by arrow 252. Transaction broker 104 communicates the shipping confirmation process manager 118f of marketplace 102f, as indicated by arrow 254, and process manager 118f communicates the shipping confirmation to user 200, as indicated by arrow 256.

In addition to the provision of individual services as described above, one embodiment of the present invention also provides aggregated services from multiple marketplaces 102. Such a feature allows a user 200 to commit to multiple services from different marketplaces 102 as if the services were actually one service from a single marketplace 102. For example, if the shipping service provided by marketplace 102d, described above in conjunction with FIG. 7B, is not able to deliver the goods purchased by user 200 to their final destination but is able to deliver the goods to an intermediate location, a second marketplace 102 may be used to provide shipping services from the intermediate location to the final destination. Although these two shipping services are provided by different marketplaces 102, broker 104 may aggregate the services such that user 200 only has to commit to one shipping service (from origin to final destination). Broker 104 then ensures that the two shipping services are integrated so that the goods are shipped to the final destination.

Figure 8:
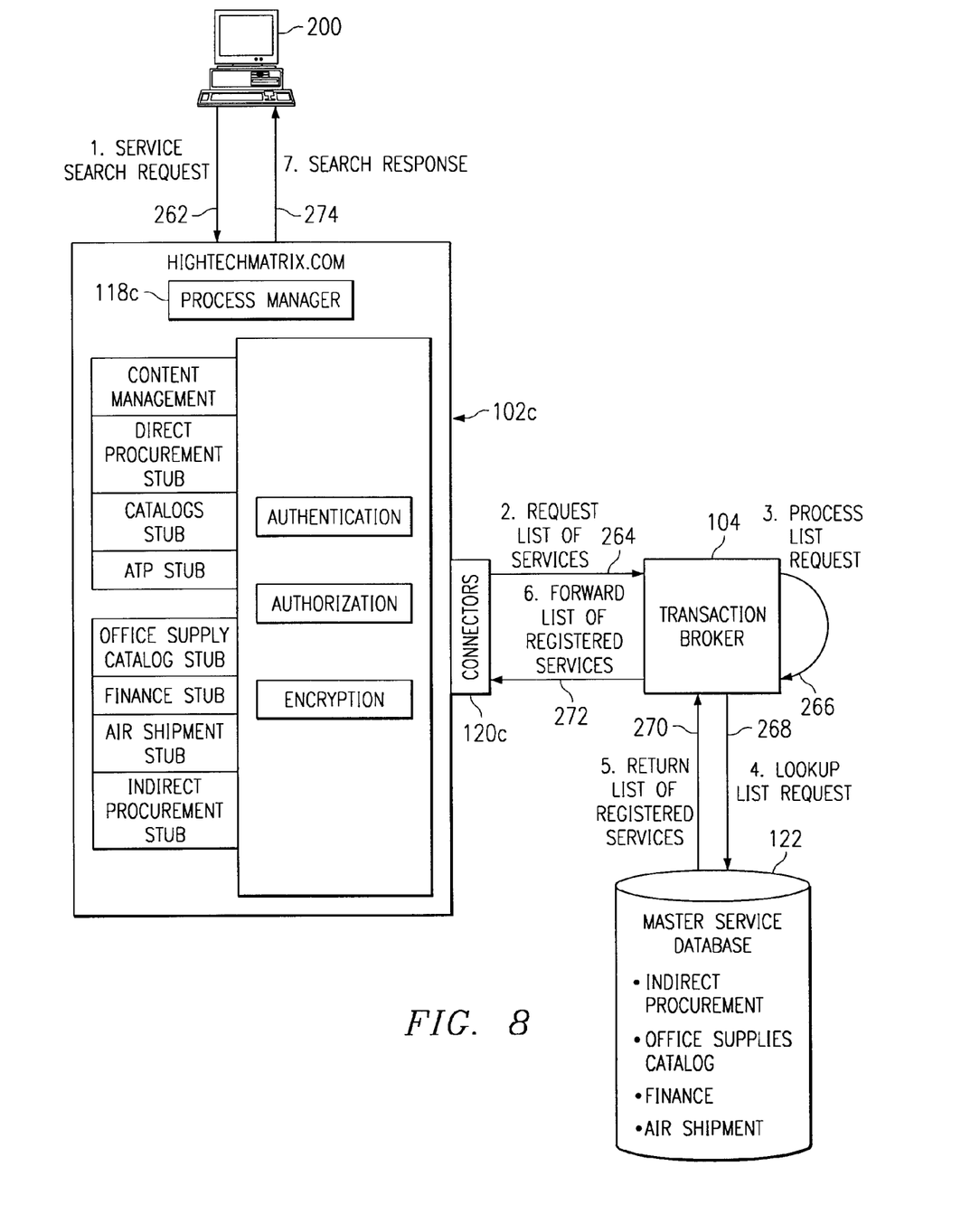
FIG. 8 illustrates an exemplary method of determining services that are available in a distributed marketplace.

FIG. 8 illustrates an exemplary method of determining services that are registered and available in distributed marketplace 100. The method begins when a user 200 of a marketplace 102, such as marketplace 102c, communicates a service search request for registered services to marketplace 102c, as indicated by arrow 262. Process manager 118c receives the query and communicates a request for a list of registered services to transaction broker 104, as indicated by arrow 264. Transaction broker 104 processes the list request, as indicated by arrow 266, and communicates a lookup list request for all registered services to master service database 122, as indicated by arrow 268. Database 122 returns a list of the services that have been registered by marketplaces 102 with transaction broker 104, as indicated by arrow 270. Transaction broker 104 forwards the list to process manager 118c using connectors 120c, as indicated by arrow 272, which then communicates the list to user 200 in the form of a search response, as indicated by arrow 274. User 200 may then request and invoke one or more services in the list, as described above.

Figure 9:
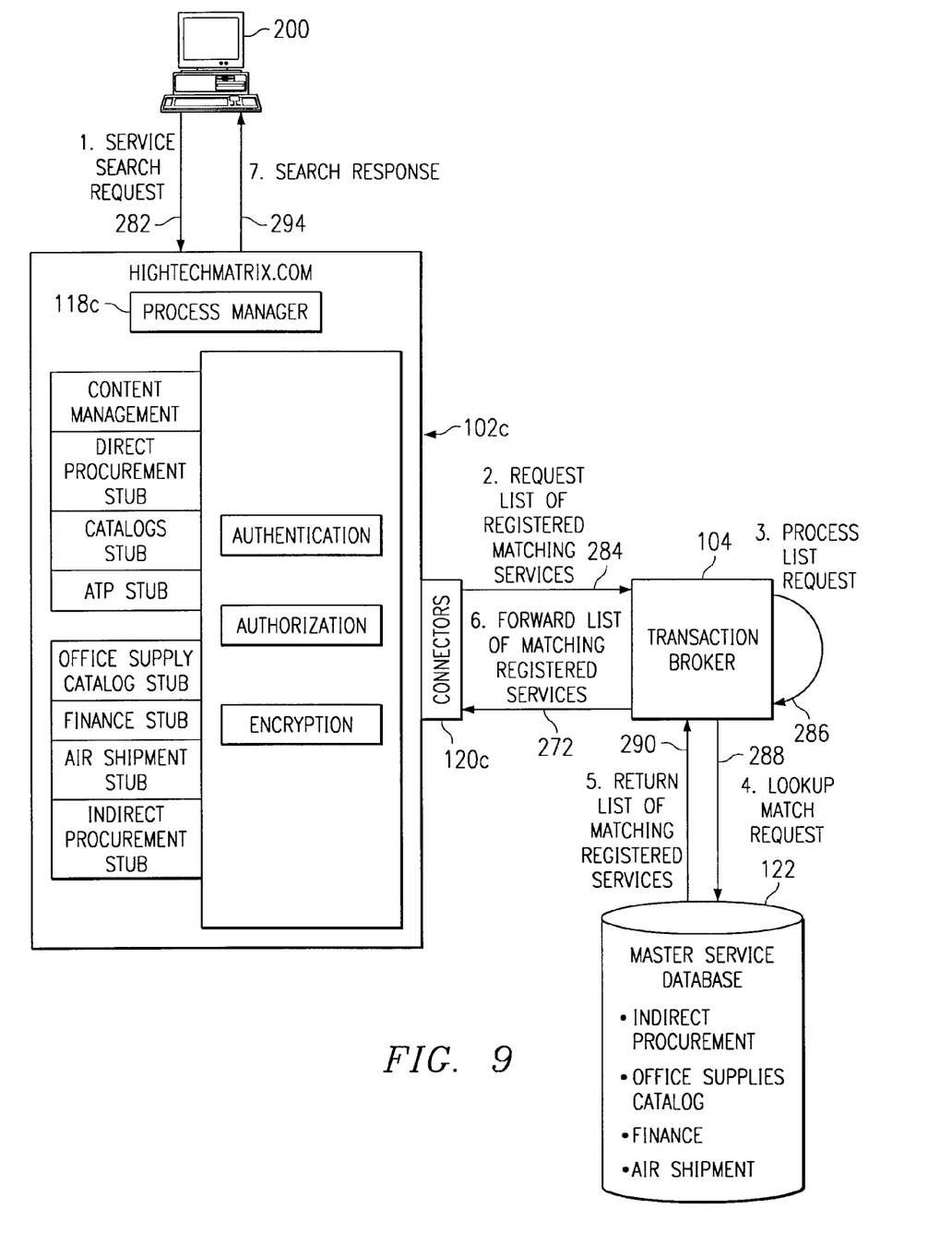
FIG. 9 illustrates an exemplary method of searching for services in a distributed marketplace having specified parameters.

FIG. 9 illustrates an exemplary method of searching for services available in distributed marketplace 100 having specified parameters. The method begins when a user 200 of a marketplace 102, such as marketplace 102c, communicates a service search request to marketplace 102c, as indicated by arrow 282. The service search request includes one or more attributes that services meeting the search request should have. Process manager 118c receives the service search request and communicates a request to transaction broker 104 for a list of registered services that have one or more attributes included in the service search request, as indicated by arrow 284. Transaction broker 104 process the list request, as indicated by arrow 286, and communicates a lookup match request to master service database 122 for registered services that include the search attributes, as indicated by arrow 288. Database 122 returns an appropriate list of matching registered services to transaction broker 104, as indicated by arrow 290. Transaction broker then forwards the list to process manager 118, as indicated by arrow 292, and process manager 118c communicates the list to user 200 in the form of a search response, as indicated by arrow 294. User 200 may be allowed to perform a search for any appropriate attributes of the services provided or of the marketplaces 102 that provide the services. These attributes may be specified by marketplaces 102 to allow marketplaces 102 to indicate specialization in certain areas and to provided competitive differentiation. Furthermore, the search request from user 200 may use a query language that is specialized for use with marketplace service searches and that allows user 200 to determine and weight selected search criteria.

It should be understood that although a number of methods have been described above, any number of these methods may be occurring at the same time. For example, a marketplace 102 may register a number of services at the same time. The marketplace 102 may also be processing local service requests and communicating distributed service requests at this same time. Furthermore, the marketplace 102 may be receiving and processing service requests from other marketplaces 102 during this period.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for computer-implemented service transaction brokering among distributed computer-implemented marketplaces, the system comprising one or more processing units and one or more memory units collectively supporting:
- a computer-implemented first marketplace operable to provide at least a first service;
- a computer-implemented second marketplace operable to provide at least a second service; and
- a computer-implemented service transaction broker module coupled to the first and second computer-implemented marketplaces and operable to:
  - receive an electronic service registration request from the second computer-implemented marketplace, the electronic service registration request comprising information related to the second service provided by the second computer-implemented marketplace;
  - store the information in a master service database containing information related to a plurality of services provided by a plurality of computer-implemented marketplaces;
  - notify the first computer-implemented marketplace of the availability of the second service; and
  - provide at least the second service of the second computer-implemented marketplace to a user coupled to the first computer-implemented marketplace in response to the user communicating an electronic service request to the first computer-implemented marketplace.

2. The system of claim 1, wherein the transaction broker module is coupled to the first and second marketplaces using the Internet.

3. The system of claim 1, wherein the user is coupled to the first marketplace using the Internet.

4. The system of claim 1, wherein the first marketplace is operable to provide the first service to the user of the first marketplace in association with the second service.

5. The system of claim 1, further comprising a local service database coupled to the first marketplace and containing information related to at least the first service.

6. The system of claim 1, wherein the first marketplace comprises a process manager operable to receive the service request and determine whether the first marketplace is operable to provide the second service.

7. The system of claim 1, wherein the transaction broker module is further operable to:
- receive a service request for the second service from the first marketplace;
- determine the location of the second service; and
- bind and invoke the second service for use by the user of the first marketplace.

8. The system of claim 1, further comprising a master service database coupled to the transaction broker module and containing information related to at least the first and second services.

9. The system of claim 8, wherein the master service database contains one or more service objects each associated with one of the marketplaces and representing a service provided by that marketplace.

10. The system of claim 9, wherein each service object is associated with one or more methods in the master service database, the methods defining how to access the service associated with the service object.

11. The system of claim 8, wherein the transaction broker module is further operable to:
- receive a service registration request from the second marketplace including information related to the second service; and
- store the information in the master service database such that the second service may be available to the user of the first marketplace.

12. The system of claim 1, wherein the transaction broker module is further operable to communicate with the first and second marketplaces using a service description language common to both marketplaces.

13. The system of claim 1, wherein the transaction broker module is further operable to:
- receive a service search request from the first marketplace;
- determine the services provided by the second marketplace that satisfy the search request; and
- communicate a list of these services to the first marketplace.

14. The system of claim 13, wherein the service search request is selected from the group consisting of a registered services request and a matching services request.

15. A computer-implemented broker module for service transaction brokering among computer-implemented marketplaces:
- the computer-implemented broker module coupled to a computer-implemented first marketplace and a computer-implemented second marketplace, the computer-implemented first marketplace operable to provide at least a first service and the computer-implemented second marketplace operable to provide at least a second service; and
- the computer-implemented broker module operable to:
  - receive an electronic service registration request from the second computer-implemented marketplace the electronic service registration request comprising information related to the second service provided by the second marketplace;
  - store the information in a master service database containing information related to a plurality of services provided by a plurality of marketplaces;
  - notify the first marketplace of the availability of the second service; and
  - provide at least the second service of the computer-implemented second marketplace to a user coupled to the first computer-implemented marketplace in response to the user communicating an electronic service request.

16. The broker module of claim 15, wherein the broker module is coupled to the first and second marketplaces using the Internet.

17. The broker module of claim 15, wherein the first service is provided to the user of the first marketplace in association with the second service.

18. The broker module of claim 15, wherein the broker module is further operable to:
- receive a service request for the second service from the first marketplace;
- determine the location of the second service; and
- bind and invoke the second service for use by the user of the first marketplace.

19. The broker module of claim 15, wherein the broker module is further operable to access a master service database containing information related to at least the first and second services.

20. The broker module of claim 19, wherein the master service database contains one or more service objects each associated with one of the marketplaces and representing a service provided by that marketplace.

21. The broker module of claim 20, wherein each service object is associated with one or more methods in the master service database, the methods defining how to access the service associated with the service object.

22. The broker module of claim 19, wherein the broker module is further operable to:

receive a service registration request from the second marketplace including information related to the second service; and store the information in the master service database such that the second service may be available to the user of the first marketplace.

23. The broker module of claim 15, wherein the broker module is further operable to communicate with the first and second marketplaces using a service description language common to both marketplaces.

24. The broker module of claim 15, wherein the broker module is further operable to:

receive a service search request from the first marketplace;

determine the services provided by the second marketplace that satisfy the search request; and communicate a list of these services to the first marketplace.

25. The broker module of claim 24, wherein the service search request is selected from the group consisting of a registered services request and a matching services request.

26. A computer-implemented first marketplace for providing distributed services using a computer-implemented service transaction broker module:

the computer-implemented first marketplace operable to provide at least a first service and to receive an electronic service request from a user;

the computer-implemented first marketplace coupled to a computer-implemented service transaction broker module; and the computer-implemented first marketplace operable to provide, using the computer-implemented service transaction broker module, a second service of a computer-implemented second marketplace to the user in response to the electronic service request, the second computer-implemented marketplace having communicated an electronic service registration request comprising information related to the second service provided by the second marketplace, the computer-implemented service transaction broker module having stored the information in a master service database containing information related to a plurality of services provided by a plurality of marketplaces and notified the first marketplace of the availability of the second service.

27. The marketplace of claim 26, wherein the first marketplace is coupled to the transaction broker module using the Internet.

28. The marketplace of claim 26, wherein the first marketplace is coupled to the user using the Internet.

29. The marketplace of claim 26, comprising a process manager operable to receive the service request and determine whether the first marketplace is operable to provide the second service and, if not, to communicate with the transaction broker module regarding the second service.

30. A method of registering a service of a distributed marketplace with a service transaction broker, comprising:

receiving a service registration request from a first marketplace at the service transaction broker, the service registration request including information related to a first service provided by the first marketplace;

storing the information in a master service database containing information related to a plurality of services provided by a plurality of marketplaces; and notifying a second marketplace of the availability of the first service.

31. The method of claim 30, wherein the information related to the first service comprises attributes of and interfaces to the first service.

32. The method of claim 30, further comprising:

extracting a service definition from the information related to the first service; and storing the service definition in the master service database.

33. The method of claim 30, wherein storing the information comprises storing a service object representing the first service.

34. The method of claim 30, further comprising determining that the second marketplace may be interested in the first service, the second marketplace being notified in response.

35. A computer-implemented method of subscribing to a service of a distributed marketplace through a service transaction broker module, the method performed using a computer system comprising one or more processing units and one or more memory units, the method comprising:

using the computer system, receiving a subscription request from a first marketplace at the transaction broker module, the subscription request indicating a service provided by a second marketplace to which the first marketplace wishes to subscribe;

using the computer system, processing the subscription request at the transaction broker module; and using the computer system, communicating information associated with the service from the transaction broker module to the first marketplace.

36. The method of claim 35, further comprising recording the subscription to the service in a master service database, the master service database operable to store information related to the service provided by a plurality of marketplaces.

37. The method of claim 36, wherein recording the subscription comprises:

adding the first marketplace to a list of subscribers to the service; and providing the first marketplace with access privileges to the information related to the service.

38. The method of claim 35, wherein communicating information associated with the service comprises communicating one or more process stub definitions associated with service.

39. The method of claim 38, further comprising:

receiving the process stub definitions at the first marketplace; and creating a process stub associated with the service at the first marketplace, the process stub providing users of the first marketplace with access to the service provided by the second marketplace through the transaction broker module.

40. A computer-implemented method of accessing a service of a distributed computer-implemented marketplace through a computer-implemented service transaction broker module, comprising:

at the computer-implemented transaction broker module:

receiving a subscription request from a second marketplace, the subscription request indicating a service provided by a first marketplace to which the second marketplace wishes to subscribe;

processing the subscription request;

communicating information associated with the service to the second marketplace; and receiving an electronic service request for the service of the first computer-implemented marketplace from the second computer-implemented marketplace;

determining an electronic address location of the service; and communicating an electronic message to the first computer-implemented marketplace to access the service in order to fulfill the electronic service request.

41. The method of claim 40, wherein the location of the service is obtained from a master service database.

42. The method of claim 40, wherein the message comprises a message to bind and invoke the first service.

43. The method of claim 40, further comprising:
receiving a service request at the second marketplace from a user coupled to the second marketplace;
determining that the service request should be fulfilled using the service; and
communicating a service request for the service to the transaction broker.

44. The method of claim 43, wherein determining that the service request should be fulfilled using the service comprises:
determining that the service is able to satisfy the service request based on one or more definitions of a process stub associated with the service and stored at the second marketplace; and
determining that the service is not provided by the second marketplace.

45. The method of claim 44, wherein determining that the service is not provided by the second marketplace comprises:
requesting a location of the service from a local service database, the local service database coupled to the second marketplace and containing information relating to services provided by the second marketplace; and
receiving a response from the local service database indicating that the location of the service is not stored in the local service database.

46. The method of claim 40, further comprising:
receiving confirmation from the first marketplace that the service request has been fulfilled using the service; and
communicating the confirmation to the second marketplace.

47. Service transaction broker software embodied in a computer readable medium and when executed, operable to:
receive a subscription request from a second marketplace, the subscription request indicating a service provided by a first marketplace to which the second marketplace wishes to subscribe;
process the subscription request;
communicate information associated with the service to the second marketplace;
receive an electronic service request for a service of a first marketplace from a second marketplace;
determine an electronic address location of the service; and
communicate a message to the first marketplace to access the service in order to fulfill the electronic service request.

48. The service transaction broker software of claim 47, wherein the location of the service is obtained from a master service database.

49. The service transaction broker software of claim 47, wherein the message comprises a message to bind and invoke the first service.

50. The service transaction broker software of claim 47, further operable to:
receive confirmation from the first marketplace that the service request has been fulfilled using the service; and
communicate the confirmation to the second marketplace.

51. A computer-implemented system for computer-implemented service transaction brokering among distributed computer-implemented marketplaces, comprising:
computer-implemented first marketplace means for providing at least a first service;
computer-implemented second marketplace means for providing at least a second service; and
computer-implemented service broker means for:
receiving an electronic service registration request from the second computer-implemented marketplace, the electronic service registration request comprising information related to the second service provided by the second computer-implemented marketplace;
storing the information in a master service database containing information related to a plurality of services provided by a plurality of computer-implemented marketplaces;
notifying the first computer-implemented marketplace of the availability of the second service; and
providing at least the second service of the computer-implemented second marketplace means to a user coupled to the computer-implemented first marketplace means in response to the user communicating an electronic service request, the computer-implemented broker means coupled to the first and second computer-implemented marketplace means.

* * * * *